US010163536B2

(12) United States Patent
Strohmer et al.

(10) Patent No.: US 10,163,536 B2
(45) Date of Patent: Dec. 25, 2018

(54) METHOD AND APPARATUS FOR RECOVERY OF RADIOACTIVE NUCLIDES FROM SPENT RESIN MATERIALS (71) Applicant: Framatome GmbH, Erlangen (DE)

(72) Inventors: Franz Strohmer, Bamberg (DE); Luis Sempere Belda, Erlangen (DE)

(73) Assignee: Framatome GmbH, Bamberg (DE)

( * ) Notice: Subject to any disclaimer, the term of this patent is extended or adjusted under 35 U.S.C. 154(b) by 92 days.

(21) Appl. No.: 15/523,981

(22) PCT Filed: Nov. 19, 2014

(86) PCT No.: PCT/EP2014/075047
§ 371 (c)(1),
(2) Date: May 3, 2017

(87) PCT Pub. No.: WO2016/078704
PCT Pub. Date: May 26, 2016

(65) Prior Publication Data
US 2018/0308597 A1 Oct. 25, 2018

(51) Int. Cl.
C25C 1/08 (2006.01)
B01J 49/60 (2017.01)
(Continued)

(52) U.S. Cl.
CPC ............. *G21F 9/007* (2013.01); *B01J 49/53* (2017.01); *B01J 49/57* (2017.01); *B01J 49/60* (2017.01);
(Continued)

(58) Field of Classification Search
CPC ................... B01J 49/60; G21F 9/06
See application file for complete search history.

(56) References Cited

U.S. PATENT DOCUMENTS

| 4,235,713 A | 11/1980 | Abad et al. |
| 5,289,468 A | 2/1994 | Yoshida |
| 7,070,685 B2 | 7/2006 | Kuhn et al. |

FOREIGN PATENT DOCUMENTS

| CA | 1250378 A | 2/1989 |
| EP | 2819125 A1 | 12/2014 |

(Continued)

OTHER PUBLICATIONS

Chang, F. et al., "Processing nuclear waste for isotope production", Waste Management, vol. 1 (Proc. Int. Conf. Tucson, AZ, 1991), Arizona Board of Regents, Phoenix, AZ (1991), pp. 781-787.
(Continued)

Primary Examiner — Melissa S Swain
(74) Attorney, Agent, or Firm — Dilworth IP, LLC (57) ABSTRACT A process for the recovery of a radioisotope from a waste resin of a nuclear power plant comprises the steps of: a) treating a waste resin loaded with at least one radioisotope with an organic acid or alkaline compound to release the at least one radioisotope and to obtain a process solution containing the at least one radioisotope; b) separating the at least one radioisotope from the process solution through a reaction specific to the radioisotope so as to obtain a treated process solution depleted of the at least one radioisotope, wherein said depleted process solution comprises the organic acid or alkaline compound and optionally a non-reacted radioisotope; c) reacting the organic acid or alkaline compound in the depleted process solution from step b) by thermal and/or photochemical oxidation to form gaseous reaction products; and d) reloading the waste resin with the reacted process solution from step c) to bind the non-reacted radioisotope on the waste resin. Further, an apparatus is provided to carry out the above method.

21 Claims, 2 Drawing Sheets (51) Int. Cl.

| | | |
|---|---|---|
| *G21F 9/06* | (2006.01) | |
| *G21F 9/00* | (2006.01) | |
| *G21F 9/30* | (2006.01) | |
| *B01J 49/53* | (2017.01) | |
| *B01J 49/57* | (2017.01) | |
| *B01J 49/70* | (2017.01) | |
| *G21D 1/02* | (2006.01) | |
| *G21G 1/00* | (2006.01) | |
| *C01B 32/50* | (2017.01) | |

(52) U.S. Cl.
CPC ............... *B01J 49/70* (2017.01); *C25C 1/08* (2013.01); *G21D 1/02* (2013.01); *G21F 9/06* (2013.01); *G21F 9/307* (2013.01); *G21G 1/001* (2013.01); *B01J 2219/00452* (2013.01); *C01B 32/50* (2017.08); *G21G 2001/0094* (2013.01); *G21Y 2004/60* (2013.01)

(56) References Cited

FOREIGN PATENT DOCUMENTS

| | | | |
|---|---|---|---|
| GB | 1533955 | A | 11/1978 |
| JP | 2013044588 | A | 3/2013 |
| WO | 96/01478 | A | 1/1996 |
| WO | 03/082751 | A1 | 10/2003 |

OTHER PUBLICATIONS

PCT International Search Report and Written Opinion dated Jun. 12, 2015 from corresponding Application No. PCT/EP2014/075047, 10 pages.

METHOD AND APPARATUS FOR RECOVERY OF RADIOACTIVE NUCLIDES FROM SPENT RESIN MATERIALS

FIELD OF THE INVENTION

The present invention relates to a method for the recovery of radioactive isotopes from spent resin materials of nuclear power plants or other nuclear facilities, and an apparatus to carry out the process.

TECHNICAL BACKGROUND

Ion exchange resins are used in nuclear power plants and other nuclear facilities particularly to purify the coolant and moderator systems. These resins are usually contaminated with high concentrations of radioactive isotopes which itself may have interesting applications in medicine, science and industry. However, at this time, the spent waste resins including the radioactive isotopes are disposed at high costs because an economically useful process is still missing to separate the radioactive isotopes from the spent ion exchange resins. In some cases, even a permanent disposal of the spent waste resins is not possible because the resins are contaminated with long-living radioactive isotopes such as C-14. Therefore, these resins must be stored on-site of the nuclear power plant.

A process for the segregation of the isotope C-14 from spent waste resins of nuclear power plants is disclosed in CA 1 250 378 A. According to this process, carbon-14 is removed from particulate ion exchange resin by contacting, preferably at 70° C., a bed of the resin with a stream of air enriched with carbon dioxide, while the particulate ion exchange resin is in contact with water to displace the carbon-14 as gaseous carbon dioxide, and then scrubbing the gaseous carbon dioxide with soluble salts of calcium or barium, e.g. calcium hydroxide and barium hydroxide, to form either calcium carbonate or barium carbonate as a stable, carbon-14 containing compound which may be immobilized in cement.

This method is very time consuming and the efficiency of regeneration with air is very low. Further, the separated carbon-14 isotope is diluted with carbon dioxide from the processing air and must be separated from this mixture, or the total mixture must be disposed as radioactive waste.

In a paper entitled "Processing nuclear waste for isotope production", CHANG, F., et al., Waste Management, Vol. 1 (Proc. Int. Conf. Tucson, Ariz., 1991), Arizona Board of Regents, Phoenix, Ariz. (1991), pages 781-787, the authors also disclose a method for recovering the isotope C-14 from spent ion exchange resin. A similar process is disclosed in U.S. Pat. No. 5,289,468 A. The isotope C-14 is removed from the ion exchange resin by acid stripping with hydrochloric acid to form carbon dioxide, which is then converted to carbon monoxide by reduction with zinc. $^{14}CO$ is enriched by laser selective dissociation or by cryogenic distillation, and the purified $^{14}CO$ is oxidized to produce carbon dioxide. The gas is finally converted to barium carbonate. However, this process substantially increases the amount of radioactive waste and disposal costs because the hydrochloric acid is used in a large excess and must be removed from the process using anionic exchange resins which then must be disposed as radioactive waste.

WO 96/01478 A is directed to a method and device for the disposal of a cationic exchange resin contaminated with radioactive and inactive cations. In the regeneration process, non-radioactive cations other than bivalent cations are converted to anionic complexes using oxalic acid and are washed out of the resin. Specifically, Fe(II) cations are oxidized to Fe(III) cations using hydrogen peroxide. The Fe(III) cations are then converted to anionic complexes using oxalic acid, and separated from the cationic ion exchanger. The anionic complexes are then oxidized and decomposed by photochemical oxidation of oxalic acid. The non-radioactive cations are disposed. The partly discharged ion exchange resin still containing the bivalent radioactive cations is reused.

WO 03/082751 A1 relates to a method for decontaminating metallic components which were exposed to radioactivity. An acid solution is used to remove radioactive contamination from the metallic components. A purification loop is provided comprising an ion exchange cell having a compartment filled with an ion exchange resin and two electrodes. A decontamination solution is passed through the ion exchange resin. The electrodes are separated from the ion exchange resin by cation exchange membranes. When a voltage is applied across the electrodes, hydrogen ions replace the cations in the ion exchange resin, which in turn are deposited at the cathode and are thereby removed from the decontamination solution. The ion exchange resin is continuously regenerated.

U.S. Pat. No. 7,070,685 B2 discloses a method to remove radionuclides from polluted water. Radionuclides present in cationic form are adsorbed on a cation exchanger, while the metals and radionuclides present in anionic form are removed from the solution by electrochemical deposition.

SUMMARY OF THE INVENTION

The object to be solved by the present invention is to provide a method that separates one or more target radio isotopes from a spent ion exchange resin in a selective and pre-calculated way. The separated radioactive isotope may further be made available for medical, industrial and/or scientific applications without substantially increasing the amount of the spent resin material. The remaining spent waste resins show a reduced radioactivity content and can therefore be stored with much lower mid- or long-term waste disposal costs.

The above object is solved by a method according to claim 1. Preferred embodiments are indicated in the dependent claims which can be combined with each other independently.

According to the invention, a method for the recovery of a radioactive isotope from a spent waste resin of a nuclear power plant comprises the following steps:
  a) treating a waste resin loaded with at least one radioisotope with an organic acid or an alkaline compound to release the at least one radioisotope from the waste resin and to obtain a process solution containing the at least one radioisotope;
  b) separating the at least one radioisotope from the process solution by means of a reaction specific to the radioisotope so as to obtain a process solution depleted of the at least one radioisotope, wherein said depleted process solution comprises the organic acid or alkaline compound and optionally a non-reacted radioisotope;
  c) reacting the organic acid or alkaline compound in the depleted process solution from step b) by in situ oxidation to form gaseous reaction products; and
  d) passing the reacted process solution from step c) through the treated waste resin of step a) to reload the non-reacted radioisotope on the waste resin.

Accordingly, the method of the present invention is a cyclic process comprising three basic steps:

The first step is a regeneration step wherein the spent ion exchange resin from a nuclear power plant is regenerated with an organic acid or alkaline compound, such as oxalic acid. The radioactive isotopes loaded on the spent waste resin are displaced by hydrogen ions of the organic acid and released from the waste resin. The resulting process solution contains one or more of the radioisotopes dissolved in the solution. The regeneration step comprises use of an organic acid or alkaline compound which can be oxidized to form gaseous products and water. Thus, the organic acid or alkaline compound used as the regenerative agent can be removed from the process in a later step without increasing the mass of the spent waste resin.

The second step is a separation step wherein at least one radioisotope is separated from the process solution. According to the invention, the separation step is made ion-specific so that it is possible to eliminate a specific target radioisotope from the process solution in a pre-calculated way. Preferably, the radioisotope is recovered in an essentially pure form so that no further purification steps are necessary. A person skilled in the art will be able to determine appropriate ion-specific separation reactions depending on the target radioisotope to be eliminated from the process solution.

The third step is an oxidation step wherein the organic acid or alkaline compound is decomposed and removed from the process solution in situ, preferably by thermal or photochemical oxidation, to form gaseous reaction products and water. After the oxidation step, the reacted process solution does not contain any additional ionic components from the regeneration step. Rather, the process solution only contains those ionic components which have been released from the spent waste resin during the regeneration step, but is depleted of the target radioisotope removed from the process solution in the separation step. Since the spent waste resin still has ionic exchange capabilities, the ionic components remaining in the process solution after the separation step are continuously re-loaded onto the waste resin during the oxidation step when being passed through the waste resin.

Optionally, the process cycle can be started again using the reloaded waste resin in step a) and separating another target radioisotope.

The resulting waste resin is depleted of the target radioisotope removed in the separation step and therefore has a reduced activity resulting in lower disposal costs. Since the regenerating agent, e.g. oxalic acid, is completely removed from the process, there is also no mass increase of the spent waste resin. The target radioisotope separated from the waste resin in the separation step can be separately stored at lower costs, or purified and sold for further use in medical, industrial or scientific applications.

The inventive method has the particular advantage that it is possible to deliberately separate a specific radioactive isotope from a spent waste resin. Although the regeneration of ion exchange resins using mineral acids is common knowledge, these processes aim at a release of all radioactive ions from the waste resin without any option to select specific radioisotopes.

In addition, the inventive method is a true re-generative process. Use of mineral acids to regenerate an ion exchange resin loaded with radioactive isotopes is described in the prior art cited above. However, the separation of the radioactive isotopes using mineral acids always results in secondary waste products because the anion of a mineral acid remains on the ion exchange resin and must be disposed together with the resin, or remains in the sludge together with other mobilized radionuclides. On the other hand, the method of the present invention does not result in a mass increase of the ion exchange resin. Rather, the method only yields water and gaseous reaction products from the decomposition of the organic acid or alkaline compound used in accordance with the invention. Given the high concentration and amount of substances used for the separation of the radionuclides, the mass balance of the process results in a considerable technical and economic advantage.

Further, the process is applicable to many radionuclides. In fact, the process can be specifically designed for the separation of every radioisotope occurring in the moderator cycle or primary side circuits of nuclear power plants. Accordingly, it will be possible to not only separate carbon-14, but also cobalt-60 which accounts for the bulk of the activity of spent waste resins from nuclear power plants. Since the separation step is ion-specific, the process can also be adapted to the separation and exploitation of a wide variety of other nuclides.

Another advantage of the inventive method is the fact that the amounts of activity present in the final depleted ion exchange resin can be precisely predetermined and controlled during the process. The ion exchange resins can be loaded exactly up to their specific activity, which still allows for a cost-effective disposal. Thus, the method can also be used for the distribution of the activity across different batches of waste resin, and allows the operator of a power plant to avoid disposal costs by utilizing the available activity load level of the waste resin without increasing the existing ion exchanger volume.

In one preferred embodiment of the invention, the waste resin is an ion exchange resin selected from the group consisting of cationic and anionic exchange resins, mixed bed ion-exchange resins and mixtures thereof. It is a particular advantage of the invention that it is not necessary to separate, for example, cationic exchange resins from anionic exchange resins. Rather, the process is compatible to all kinds of spent waste resins and mixtures thereof.

Preferably, the organic acid used in the regeneration step is a linear aliphatic carboxylic acid selected from the group consisting of mono-, di- or polycarboxylic acids and mixtures thereof, preferably carboxylic acids having 1 to 4 carbon atoms. Most preferably, the organic acid is formic acid, tartaric acid and/or oxalic acid.

The alkaline compound used in the regeneration step can be selected from the group of ammonia, hydrazine, and linear aliphatic monoamines, diamines and polyamines, as well as mixtures thereof. Preferably, the alkaline compound is a linear aliphatic amine having 1 to 4 carbon atoms. A preferred example for the alkaline compound is ethylenediamine, ammonia or hydrazine and mixtures thereof. Other organic acids or alkaline compounds may also be useful, such as citric acid or tartaric acid, as long as these compounds can be converted to water and gaseous products such as carbon dioxide and/or nitrogen by means of thermal or photochemical oxidation reactions. Since the organic acid or alkaline compound will be decomposed in the oxidation step, no residues will remain in the process solution, and the mass of the spent waste resin will not increase.

According to a preferred embodiment, the organic acid is oxalic acid or formic acid, and the concentration of the organic acid in the process solution is controlled in a range of from 0.5 to 100 g/l. Use of oxalic acid or formic acid is sufficient to release substantially all radioisotopes from the spent waste resin and to obtain a process solution containing the radioisotopes in the form of ionic components dissolved in the solution.

Preferably, the process solution in the regeneration step has a pH of less than or equal to 3, more preferably less than or equal to 2. At a pH of less than or equal to 3, substantially all of the radioisotopes loaded on the waste resin are dissolved in the process solution.

According to a preferred embodiment, an oxidizing agent is added to the process solution during the regeneration step in order to adjust the electrochemical potential of the solution. More preferably, the oxidizing agent is selected from the group consisting of ozone, hydrogen peroxide and mixtures thereof. Adjusting the electrochemical potential of the process solution allows for a control of the oxidation state of the radioisotopes. For example, it is known that tri-valent cations show a lower affinity to ion exchange resins than di-valent cations. Thus, controlling of the electrochemical potential of the process solution assists the release of the radioisotopes from the spent waste resin.

The separation step wherein the at least one radioisotope is separated from the process solution by means of a reaction specific to the radioisotope preferably comprises a physical reaction, an electrochemical reaction or a precipitation reaction.

Preferably, the physical reaction comprises at least one of stripping gaseous material from the process solution, crystallizing a compound containing the radioisotope from the process solution, diffusing the radioisotope from the process solution, such as diffusing the radioisotope through a semipermeable or ion-specific membrane, and distillation of a compound containing the radioisotope such as in case of volatile radioactive compounds.

The electrochemical reaction preferably comprises the deposition of the radioactive isotope on an electrode as a metal, metal salt or a metal oxide by electro-chemical reduction.

The precipitation reaction preferably comprises a step of reacting the radioisotope with a compound such as metal salt or complex to form an insoluble salt or complex of the radioisotope, and separating the insoluble salt or complex from the solution by filtration. Precipitation reactions to separate specific ionic components from a process solution are known to a person skilled in the art. The precipitation of insoluble compounds from the process solution can also be assisted by adjusting the pH value of the solution.

Since the separation step is ion-specific, a first specific radioactive isotope can be separated from the process solution using a first separation reaction, and a second specific radioisotope different from the first radioisotope can be separated from the solution by repeating the separation reaction using different conditions or a different type of separation reaction specific to the second radioisotope, without removing the organic acid or alkaline compound from the process solution and/or reloading the waste resin with the non-reacted radioisotopes. According to this embodiment, the reaction cycles are shortened, and the process can be carried out with lower costs.

The radioisotopes separated from the process solution are preferably recycled for use in chemical, industrial or scientific applications, preferably in chemical, biological and/or medical applications.

Once the target radioisotope is separated from the process solution by means of an ion-specific separation reaction, the process solution depleted of the target radioisotope and containing the organic acid or alkaline compound is subjected to the oxidation step wherein the organic acid or alkaline compound is converted to gaseous reaction products and/or water by means of thermal and/or photochemical oxidation. Preferably, an oxidizing agent is added to the process solution in order to react with the organic acid or alkaline compound.

The oxidizing agent preferably is selected from hydrogen peroxide and ozone. Preferably, the concentration of the oxidizing agent in the process solution is in the range of from 0.002 mol/l to 0.02 mol/l In a preferred embodiment, the organic acid or alkaline compound in the process solution is reacted by exposure to ultraviolet radiation, optionally in the presence of the oxidizing agent. Preferably, the wave length of the UV radiation is in the range of from 250 to 350 nm.

The gaseous reaction products obtained in the oxidation step preferably comprise carbon dioxide and optionally nitrogen.

The photocatalytic or thermal oxidation of the organic acid or alkaline compound results in gaseous reaction products and water. Preferably, the gaseous reaction products are carbon dioxide and optionally nitrogen. Thus, the reaction does not leave any secondary waste products resulting from the organic acid or alkaline compound. Removal of the organic acid or alkaline compound also changes the pH of the process solution so that the radioactive isotopes are transported back to and reloaded on the spent waste resin. Accordingly, the process is a cyclic process resulting in the waste resin depleted of the separated radioactive isotopes, and process water essentially free of any secondary waste products.

According to a preferred embodiment of the invention, the radioisotope is selected from the group of carbon-14 and Co-60. Carbon-14 is an economically useful radionuclide which is currently produced in separate processes using non-commercial reactors. Co-60 contributes to the bulk of the activity in spent nuclear waste resins.

Preferably, the target radioisotope is Co-60, and the process solution in the regeneration step is controlled at an electrochemical potential in the range of from 200 to 350 mV. If the electrochemical potential of the process solution is in this range, cobalt(II) is oxidized to form cobalt(III) which only has a low affinity to the ion exchange resin. Thus, substantially all of the cobalt-60 is released from the resin and dissolved in the process solution, preferably in the form of a cobalt(III) complex.

In the separation step, cobalt-60 is preferably separated from the process solution by means of an electrochemical reduction. More preferably, the separation step comprises deposition of cobalt-60 as a metal or metal oxide on an electrode by electrochemical reduction.

According to another preferred embodiment, the radioisotope is C-14, and the separation step comprises a physical stripping of $^{14}CO_2$ from the process solution.

Examples for useful target radioisotopes include the following:

$^{14}C$: Stripping as $^{14}CO_2$
$^{14}C$: Precipitation as barium carbonate $BaCO_3$
$^{60}Co$: Precipitation as barium carbonate $BaCO_3$
$^{60}Co$: electrochemical deposition as a metal or metal salt on diamond electrodes at the cathode
$^{59}Fe$: electrochemical deposition as a metal or metal salt on diamond electrodes at the cathode
$^{131}I$: Precipitation as silver iodide AgI
$^{110}Ag$: electrochemical deposition as a metal on platinum or aluminum electrodes at the cathode
$^{110}Ag$: Precipitation as silver iodide AgI
$^{90}Sr$: Precipitation as strontium carbonate $SrCO_3$ In a further aspect of the invention, an apparatus for carrying out the above method comprises:

a regenerating vessel for receiving a particulate waste resin loaded with the at least one radioisotope;

a reaction chamber for reacting the organic acid or alkaline compound in the process solution by thermal or photochemical oxidation wherein the reaction chamber is arranged downstream of the ion exchange column;

a storage vessel for receiving the process solution wherein the storage vessel is arranged downstream of the reaction chamber and further connected to the regenerating vessel to form a cycle, and wherein the storage vessel has means for feeding the organic acid or alkaline compound into the process solution, and means for discharging one or more gaseous reaction products from the storage vessel; and a bypass line for uncoupling the regenerating vessel from the cycle.

Preferably, the apparatus is designed as a mobile system so that the spent waste resins from a nuclear power plant can be transferred in portions into the regenerating vessel and processed batchwise on-site the nuclear power plant to separate the target radioisotope.

The storage vessel can be adapted to carry out the separation step of the inventive process. Preferably, the storage vessel comprises an ultrasonic generator to assist stripping of gaseous material from the process solution. In another embodiment, the apparatus preferably comprises a separation chamber for separating the at least one radioisotope from the process solution by means of an ion-specific reaction.

Preferably, the apparatus further comprises means for measuring and controlling the pH, the conductivity, the electrochemical potential and/or the radiation activity of the process solution and/or the spent waste resin.

The apparatus may further comprise means for the addition of an oxidizing agent to the process solution, as well as means for the collection and/or discharge of the separated radioisotope.

The present invention provides an economic advantage because the treated waste resin has a decreased activity so that the operator of the power plant saves disposal costs for the waste resin. At the same time, the waste amount remains the same and will not be increased by secondary waste products. On the other hand, some of the radioactive isotopes removed from the waste resin are of economic interest because they are now available from commercial power plant operations, rather than being produced in non-commercial scientific reactors. Accordingly, an additional profit can be gained from the sales of these radioisotopes which are required in medical, industrial and/or scientific applications.

In addition, the inventive process has an ecological advantage because it is no longer necessary to separately produce radionuclides such as carbon-14 in a separate process using non-commercial power plants. Rather, these radioisotopes can now be obtained from waste products of commercial nuclear power plants. Since carbon-14 has a long half-life, it is desirable to reduce the total amount of this radioisotope produced worldwide.

BRIEF DESCRIPTION OF THE DRAWINGS

The invention will now be explained in more detail, by way of example only, with reference to the accompanying drawings wherein FIG. 1 schematically shows a flow chart of the apparatus and process for the separation of cobalt-60 from spent waste resin.

DETAILED DESCRIPTION OF PREFERRED EMBODIMENTS

Example 1

Figure 1:
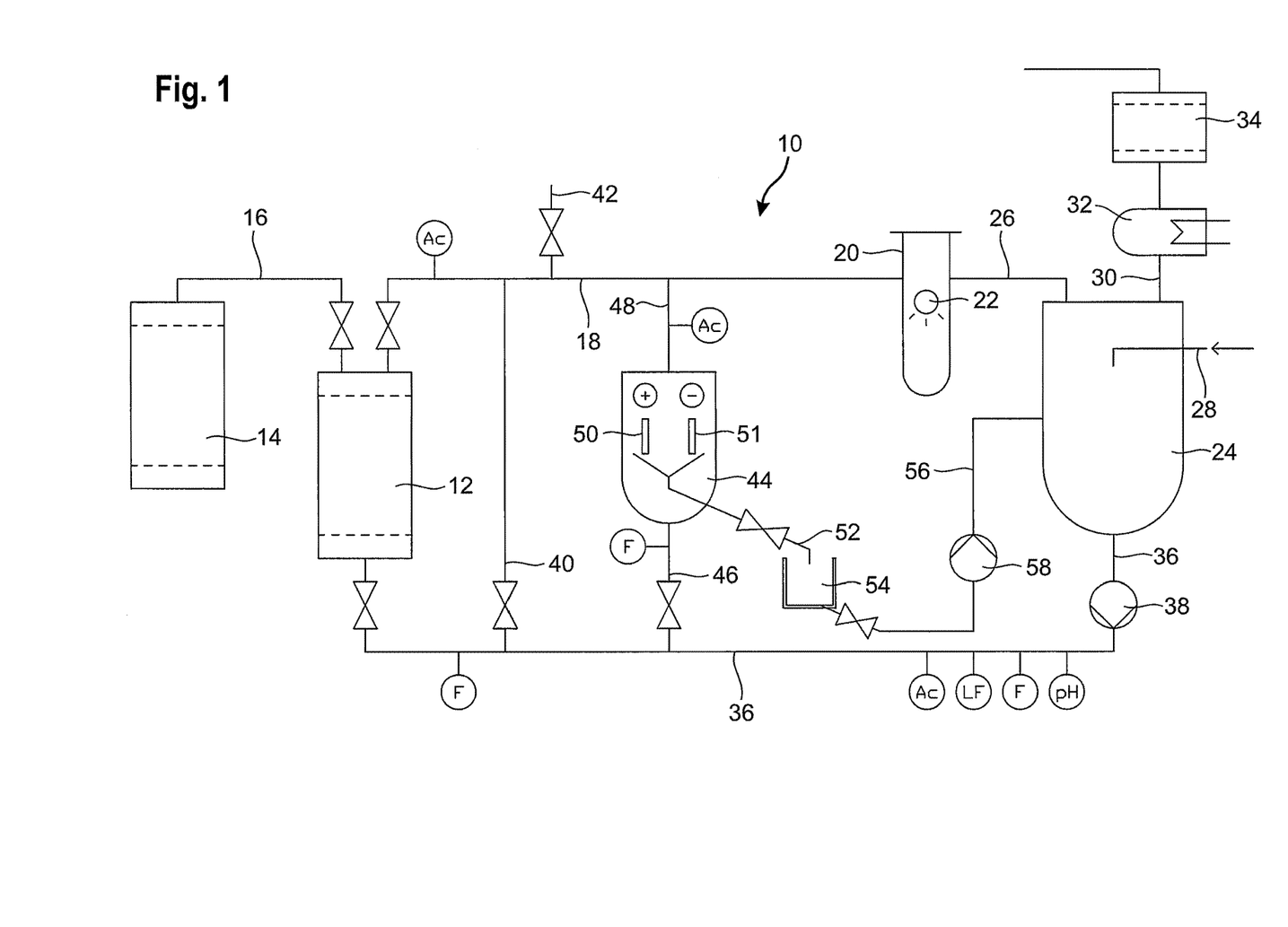

Referring to the drawings, FIG. 1 shows an apparatus for the recovery of cobalt-60 from a spent waste resin of a nuclear power plant. The apparatus 10 comprises a regenerating vessel 12 for receiving a slurry of the spent waste resin loaded with at least one radioactive isotope from a nuclear power plant. Preferably, the radioactive isotope comprises Co-60. A predetermined volume of spent waste resin is fed to the regenerating vessel 12 via line 16 from a resin storage container 14 which is stored on-site of the nuclear power plant. The regenerating vessel may be arranged on a mobile system so that the apparatus 10 can be transported to and used at various locations.

Preferably, the regenerating vessel 12 comprises an ion exchange column for receiving the predetermined volume of the spent waste resin, and more preferably the ion exchange column is shielded with lead against the emission of radioactive radiation.

Line 18 connects the regenerating vessel 12 to a reaction chamber 20 for reacting the organic acid or alkaline compound in the process solution by thermal or photochemical oxidation. Generally, the direction of flow of the process solution is from the regenerating vessel 12 through line 18 to the reaction chamber 20. Preferably, reaction chamber 20 is equipped with an ultraviolet light source 22 to expose the process solution flowing through reaction chamber 20 to ultraviolet radiation.

Line 26 connects the reaction chamber 20 to a storage vessel 24 for receiving the process solution.

Supply line 28 is connected to the storage vessel 24 for feeding the organic acid or alkaline compound and/or other processing chemicals into the storage vessel. Storage vessel 24 also has a discharge line 30 connected to the vessel for discharging air and other gaseous products into the environment. Discharge line 30 preferably is equipped with a cooling device 32 and a further filtering device 34 to retain any aerosols and/or solid fine particles.

Line 36 closes the cycle and connects the storage vessel 24 to the regeneration vessel 12. Preferably, line 36 is equipped with a pump 38 and optionally with at least one of an activity meter Ac, an electrical conductivity meter LF, a flow meter F and a pH meter pH.

A bypass line 40 is provided between line 36 and line 18 for uncoupling the regenerating vessel 12 from the cycle and blocking a feed of the process solution through the regenerating vessel 12 and the spent waste resin.

The apparatus 10 further comprises an oxidant supply line 42 for feeding an oxidizing agent into line 18.

All lines are equipped with appropriate valves for controlling the flow of liquids, slurries and gases therealong. The function and operation of these valves is known to the skilled person and is therefore not described in detail herein.

According to the embodiment shown in FIG. 1, a separation vessel 44 is connected to line 36 and the storage vessel 24 through line 46. Line 46 preferably is equipped with a flow meter F. Further, line 48 connects the separation vessel to line 18. Line 48 preferably is equipped with an activity meter Ac. Separation vessel 44 comprises a pair of electrodes 50, 51 for the separation of cobalt-60 from the process solution by electrochemical reduction. Separation vessel 44 is also equipped with a discharge line 52 to discharge separated cobalt metal from the separation vessel 44 into a storage container 54. Preferably, line 56 connects the storage container 54 to the storage vessel 24, and is equipped with a vacuum pump 58.

a) Preliminary Processing of the Spent Waste Resin

The operation of apparatus 10 is started by transferring a predetermined volume of a spent waste resin loaded with at least one radioactive isotope such as cobalt-60 from the resin storage container 14 at the nuclear power plant into the regenerating vessel 12 of apparatus 10, for example by using a mixture of water and pressurized air and pumping a slurry of the waste resin into regenerating vessel 12. The total activity of the spent waste resin in the regenerating vessel can be calculated from the volume of the spent waste resin.

The regenerating vessel 12 filled with a known quantity of the spent waste resin is separated from the cycle by closing appropriate valves in lines 18 and 36, bypass line 40 is opened and the cycle is filled with demineralized water. Pump 38 is operated and the cycle is checked for leak proofness. The process water is pumped from storage vessel 24 through bypass line 40 to reaction vessel 20 and back to storage vessel 24.

b) Regenerating Step

As soon as the cycle is leak tight and operating in a stable state, bypass line 40 is closed and the process water is pumped through the regenerating vessel 12 including the spent waste resin. The flow rate through regenerating vessel 12 can be determined by flow meter F in line 36. The activity taken up or discharged from the spent waste resin in the regenerating vessel 12 can be determined by activity meters Ac in lines 36 and 18, upstream and downstream of the regenerating vessel.

The regenerating step is started by feeding concentrated oxalic acid into the storage vessel 24 via supply line 28. Preferably, the concentration of the oxalic acid in the process solution is controlled to be in the range of from 0.5 to 100 g/l. The pH value of the process solution is controlled to be less than 3, and is measured by pH-meter pH in line 36. In addition, hydrogen peroxide is supplied to the process solution via supply line 42, and the electrochemical potential of the process solution is controlled in a range of between 200 and 350 mV, as measured against a reference electrode Ag/AgCl at 25° C.

Under these process conditions, cobalt(II) is released from the spent waste resin, oxidized to cobalt(III) and dissolved in the process solution in the form of a tris(oxalato)cobaltate(III) complex. In the spent waste resin, cobalt(II) is initially bound to sulfonic acid groups of the ion exchange polymer. The oxalic acid added to the process solution continuously displaces the cobalt(II) ions from the polymer, and cobalt(II) ions are dissolved in the form of a tris(oxalato)cobalt(II) complex according to the following formula:

$$\text{Polymer-SO}_3]_2\text{-Co}+2\text{H}_3\text{O}^++3\text{OOC-COO}^{2-}\rightarrow 2\text{Polymer-SO}_3\text{H}++2\text{H}_2\text{O}+[\text{Co}\{(\text{COO})_2\}_3]^{4-}$$

The amount of hydrogen peroxide added to the process solution, preferably at a concentration of less than or equal to 0.5 mg/kg, is sufficient to oxidize the tris(oxalato)cobalt(II) complex to tris(oxalato)cobalt(III) according to the following formula:

$$2[\text{Co}\{(\text{COO})_2\}_3]^{4-}+\text{H}_2\text{O}_2+2\text{H}_3\text{O}^+\rightarrow 2[\text{Co}\{(\text{COO})_2\}_3]^{3-}+4\text{H}_2\text{O}$$

The tris(oxalato)cobalt(III) complex has a low affinity to the ion exchange resin. Accordingly, substantially all of the cobalt-60 load can be released from the spent waste resin in the regeneration vessel 12 and dissolved in the process solution. The release of the cobalt-60 from the waste resin and the oxidation of cobalt(II) to cobalt(III) are controlled by keeping the pH value of the process solution at less than 3.0, preferably less than 2.0, as measured at a reference temperature of 25° C., and by keeping the electrochemical potential of the process solution in the range of between 200 and 350 mV, as measured against a reference electrode Ag/AgCl at 25° C.

Alternatively, the mole ratio of cobalt(III)/cobalt(II) in the process solution is controlled to be equal or greater than 9:1. In this case, the mole ratio of iron(III)/iron(II) is considered as an equivalent to the mole ratio of cobalt(III)/cobalt(II). Samples are taken from the process solution, and are analyzed for the concentration of iron(II) and the total iron concentration by means of a colorimetric test. The difference of both measurements gives the iron(III) concentration of the solution. Since cobalt and iron are chemically similar, the test results are used as a measure of the cobalt(III)/cobalt(II) ratio.

The release of cobalt-60 from the spent waste resin is terminated as soon as no further increase of activity can be measured in the process solution, or when the spent waste resin has achieved its calculated and predetermined residual activity. The actual activity of the spent waste resin can be calculated from the known initial activity of the spent waste resin and the activity of cobalt-60 in the process solution.

c) Separating Step

After the release of cobalt-60 from the spent waste resin is terminated, the regenerating vessel 12 is uncoupled from the cycle, for example by closing appropriate valves arranged in lines 18 and 36. In addition, the addition of hydrogen peroxide is stopped.

Substantially all of the cobalt-60 is now dissolved in the process solution. The process solution containing the cobalt-60 is passed through the separation vessel 44, and the diamond electrodes 50 are operated preferably at a maximum voltage of 13 V. Cobalt-60 is deposited at the cathode 50 of the pair of diamond electrodes 50, 51, either as a foam or in the form of a compact solid layer, as a metal, as cobalt(II) oxide or mixed oxide. The deposition process is continuously controlled by measuring the current flow and/or the voltage curve at the electrodes 50, 51. Preferably, the pair of diamond electrodes 50, 51 is shielded with lead. When the deposition process is finished, or if the activity of the cobalt on the cathode 50 reaches a predetermined level, the cobalt-60 is detached from the cathode 50 and transferred to the storage container 54. The detachment of the cobalt-60 deposited on the cathode is initiated by reversing the polarity of the pair of electrodes 50, 51 for a predetermined period, and can be controlled by measuring the activity of the cobalt-60 at the electrodes 50, 51.

Preferably, the cobalt detachment is repeated several times to return the electrodes 50, 51 to their original condition without a cobalt layer.

After the cobalt-60 concentration in the process solution has reached a predetermined limit, the diamond electrodes 50 are cleaned by reversing the polarity, and the storage container 54 is separated from the cycle. The storage container 54 preferably is dewatered, the cobalt-60 charge is vacuum dried, and the separated cobalt-60 charge is collected and processed for recycling or disposal.

The process solution in the cycle is depleted of cobalt-60, but may contain other radioisotopes and/or ionic compounds resulting from corrosion, including iron, nickel and chromium as well as activated products thereof.

d) Oxidation Step

Once the cobalt-60 nuclide is separated from the process solution, the oxidation step is started by operation of the ultraviolet light source 22 in reaction chamber 20. Bypass line 40 is closed, the regenerating vessel 12 is again coupled with the cycle, and the process solution in the cycle is pumped through the regenerating vessel 12 comprising the ion exchange column and the spent waste resin. An oxidizing agent is added to the cycle via supply line 42. The oxalic acid in the process solution is continuously decomposed by photocatalytic oxidation to form water and carbon dioxide, according to the following formula:

$$HOOC-COOH+H_2O_2 \rightarrow 2CO_2+2H_2O$$

Preferably, the oxidizing agent is selected from the group of ozone, oxygen, air and hydrogen peroxide, most preferably hydrogen peroxide. More preferably, the concentration of the hydrogen peroxide in the process solution is in the range from 0.002 mol/l to 0.02 mol/l.

During the decomposition of the oxalic acid, the process solution continuously passes the regenerating vessel 12 and the spent waste resin. Since the concentration of the oxalic acid in the process solution is continuously reduced, all ions and nuclides in the process solution are again bound onto the spent waste resin in the regenerating vessel 12. Simultaneously, free acid is released from the ion exchange resin back into the process solution. The actual activity load on the spent waste resin can be calculated at any time by monitoring the flow rate and the activity in the process solution upstream and downstream of the regenerating vessel 12, by means of activity meters Ac in lines 36 and 18. Further, the decomposition rate of the oxalic acid can be monitored by measuring the pH value and the electric conductivity of the process solution.

The oxidation process is continued until the process solution reaches a minimum electrical conductivity. At this time substantially all of the remaining radioisotopes and other non-radioactive ions are bound on the spent waste resin. The minimum electrical conductivity of the process solution at the end of the oxidation step preferably is in the range of from 1 to 100 μS/cm at 20° C. The process solution is pumped through the regenerating vessel 12 until the activity in the process solution is reduced to an acceptable lower limit.

e) Discharge of the Waste Resin

After the oxidation step is terminated and the remaining radioisotopes are bound onto the spent waste resin, the spent waste resin is transferred to a waste container for on-site storage and/or disposal of the waste resin at the nuclear power plant. Due to the reduced activity of the waste resin depleted of cobalt-60, storage requirements and disposal costs are reduced.

The remaining process solution is removed from the cycle and either reused or disposed. The apparatus is then ready for taking a further batch of the spent waste resin to be depleted of the target radioisotope.

Example 2

Figure 2:
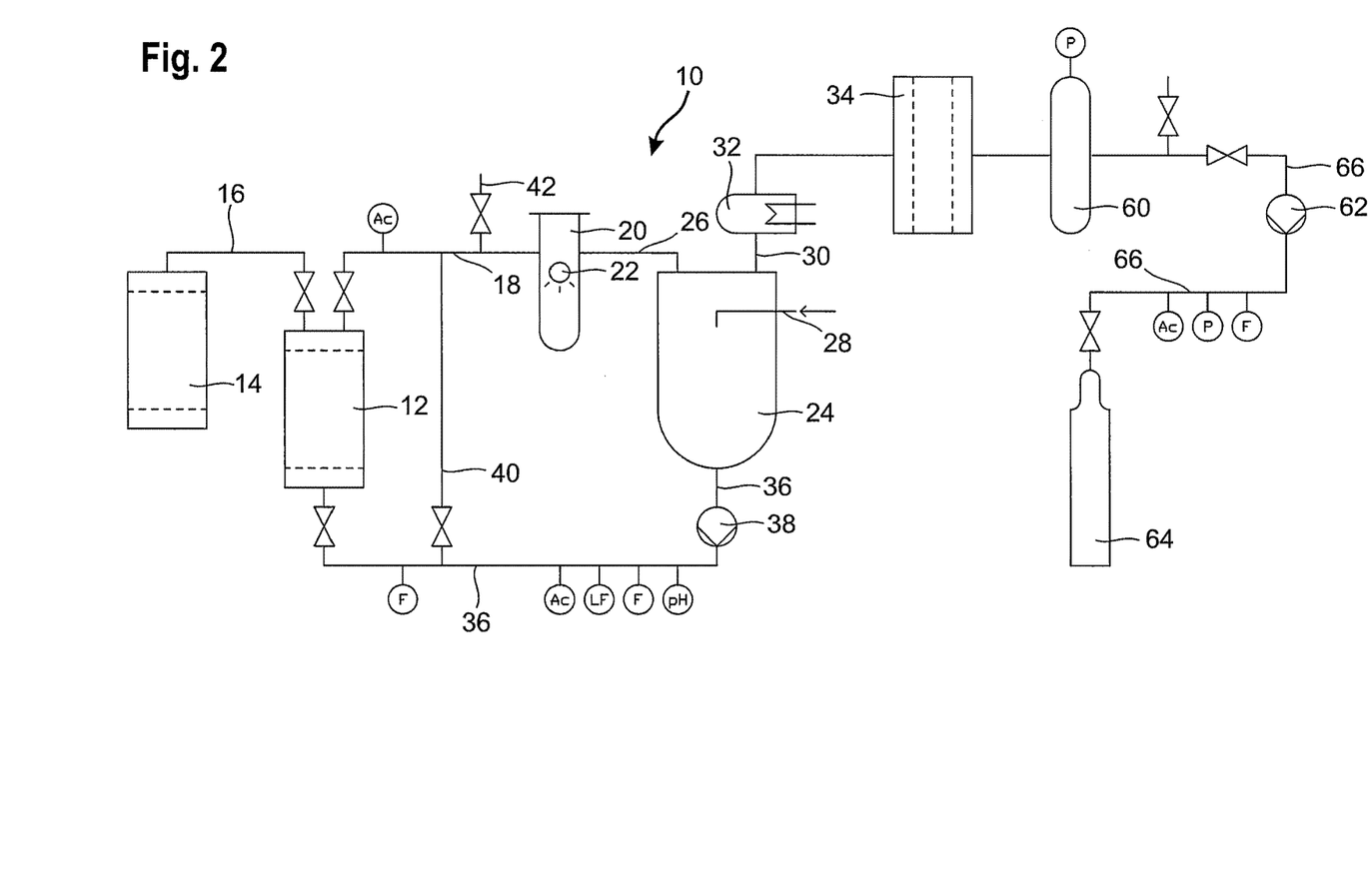
FIG. 2 schematically shows a flow chart of the apparatus and process for the separation of carbon-14 from a spent waste resin.

FIG. 2 shows a variation of the apparatus 10 shown in FIG. 1, wherein the same reference numerals are used to indicate the same structural parts as in FIG. 1.

The apparatus schematically shown in FIG. 2 is adapted for the separation of carbon-14 from a spent waste resin. The apparatus 10 comprises a regenerating vessel 12 for receiving a slurry of the spent waste resin from a nuclear power plant. Usually, the C-14 is bound to the waste resin in the form of a carbonate ion. A predetermined volume of the spent waste resin is fed to the regenerating vessel from a resin storage container 14 through transfer line 16.

The apparatus further comprises reaction chamber 20 equipped with a UV light source 22 connected to the regenerating vessel 12 via line 18.

The storage vessel 24 is connected to the reaction chamber 20 via line 26.

Line 36 closes the cycle by connecting the storage vessel 24 to regenerating vessel 12. Line 36 is equipped with pump 38 and means for monitoring the process parameters such as activity meter Ac, conductivity meter LF, flow meter F and pH meter pH.

A bypass line 40 uncouples the regenerating vessel 12 from the cycle by connecting line 36 with line 18.

Generally, all lines are provided with appropriate valves for controlling the flow of gases, liquids and slurries therealong. Generally, the functioning of these valves is known to the person skilled in the art and will not be described in detail herein.

In contrast to the apparatus shown in FIG. 1, the storage vessel 24 may be equipped with means to assist the separation of carbon dioxide from the process solution, such as an ultrasonic generator (not shown). Discharge line 30 connects the storage vessel 24 to a cooling device 32 and an aerosol filter 34.

The apparatus further comprises a surge tank 60 downstream of filter 34, as well as at least one compressor unit 62 and a gas storage container 64 downstream of surge tank 60 and connected to each other via line 66.

a) Preliminary Processing of the Spent Waste Resin

The process of recovering carbon-14 from the spent waste resin is started by transferring a known quantity of the particulate spent waste resin from the resin storage container 14 to the regenerating vessel comprising an ion exchange column. Preferably, the ion exchange column or regenerating vessel 12 is shielded with lead against the emission of radioactive radiation. The regenerating vessel 12 is uncoupled from the cycle, and bypass line 40 is open. The cycle is filled with demineralized water, and pump 38 is operated. In this preliminary step, the cycle is checked for leak proofness. The water is pumped from the storage vessel 24 through line 36, bypass line 40, line 18, reaction chamber 20, line 26 back to storage vessel 24.

The storage vessel 24 is hermetically sealed, and the head space above water level is flooded with an inert gas. In addition, lines 30 and 66 connecting the storage vessel to the cooling device 32, filter 34, surge tank 60 and compressor unit 62 up to gas storage container 64 are also flooded with the inert gas. Preferably, the inert gas is selected from the group consisting of argon, nitrogen and carbon dioxide, most preferably carbon dioxide.

b) Regenerating Step

After the cycle is operating in a stable state, the regenerating step is started by closing bypass line 40 and passing the process water through the waste resin in regenerating vessel 12.

Organic acid is continuously supplied to the process water so as to reduce the pH value of the process solution. Preferably, concentrated oxalic acid is used as the organic acid. The pH value in the process solution is preferably controlled to be less than 3. As the pH value of the process solution is continuously reduced, C-14 is released from the spent waste resin in the form of hydrogen carbonate or carbon dioxide. The hydrogen carbonate and/or carbon dioxide are dissolved in the process solution.

The flow rate of the process solution through the regenerating vessel can be determined by flow meter F in line 36. The activity taken up via the process solution or discharged from the spent waste resin in the regenerating vessel is preferably determined by activity meters Ac in lines 36 and 18 upstream and downstream of the regenerating vessel.

c) Separation of C-14

After the activity in the process solution reaches a predetermined level, the separation step is started. Bypass line 40 is opened and the regenerating vessel 12 is uncoupled from the cycle. Concentrated oxalic acid is continuously added to the process solution to further reduce the pH value of the process solution, preferably to less than 2. The radioisotope C-14 is stripped from the process solution in the form of carbon dioxide, according to the following formulas:

$$CO_3^{2-} + H_3O^+ \rightarrow HCO_3^- + H_2O$$

$$HCO_3^- + H_3O^+ \rightarrow CO_2 + H_2O$$

The carbon dioxide is collected in the head space above the process solution in storage vessel 24. Stripping of carbon dioxide from the process solution in the storage vessel 24 is assisted by operating an ultrasonic generator in the storage vessel 24. The carbon dioxide containing the radioisotope C-14 is transferred from the storage vessel 24 to the cooling device 32 via line 30.

In the cooling device 32, the carbon dioxide is cooled down to separate any moisture in the carbon dioxide by condensation. The separated moisture is transferred back to the storage vessel 24.

The dried carbon dioxide is then passed through a filtration unit 34 in order to separate the carbon dioxide from any particles and aerosols. The filtration unit preferably has a pore diameter of 0.5 µm or less. The dried and separated carbon dioxide preferably is at a temperature in the range of from −5 to 10° C., and is then passed through surge tank 60 to compressor unit 62. In the compressor unit 62, the carbon dioxide is further densified and pumped into gas storage container 64 for storage and further use. Alternatively, the carbon dioxide containing the radioisotope C-14 can also be reacted with barium hydroxide or calcium hydroxide to be precipitated as insoluble carbonate, or the carbon dioxide can be absorbed on molecular sieve.

Preferably, however, the carbon dioxide containing the radioisotope C-14 is stored in pressurized gas containers under a pressure of about 300 bar, which is industrially common and technically efficient. Moreover, the steal cladding of a pressurized gas container is sufficient to retain the radioactive beta radiation from C-14.

Preferably, line 66 connecting the compressor unit to the pressurized gas container 64 is equipped with a flow meter F, a pressure meter P and an activity meter Ac so that the quantity of C-14 separated from the process solution and filled into the pressurized gas container can be determined at any time. C-14 stored in the form of pressurized carbon dioxide is also suitable for use in later enrichment steps.

d) Oxidation Step

The oxidation step is started as soon as the activity in the process solution as determined by activity meters in lines 36 and 18 reaches a predetermined lower limit.

The ultraviolet light source 22 in reaction chamber 20 is operated to expose the process solution to ultraviolet radiation. Bypass line 40 is closed, regenerating vessel 12 is coupled to the cycle, and the process solution in the cycle is pumped through the regenerating vessel 12 comprising the ion exchange column and the spent waste resin. An oxidizing agent such as hydrogen peroxide is added to the cycle via supply line 42. The oxalic acid in the process solution is continuously decomposed by photocatalytic oxidation to form water and carbon dioxide, according to the following formula:

$$HOOC-COOH + H_2O_2 \rightarrow 2CO_2 + 2H_2O$$

During the decomposition of the oxalic acid, the process solution continuously passes the regenerating vessel 12 and the spent waste resin. Since the concentration of the oxalic acid in the process solution is continuously reduced, all ions and nuclides in the process solution are again bound onto the spent waste resin in the regenerating vessel 12. Simultaneously free acid is released from the ion exchange resin back into the process solution. The actual activity load on the spent waste resin can be calculated at any time by monitoring the flow rate and the activity in the process solution upstream and downstream of the regenerating vessel 12, by means of activity meters Ac in lines 36 and 18. Further, the decomposition rate of the oxalic acid can be monitored by measuring the pH value and the electric conductivity of the process solution.

The oxidation process is continued until the process solution reaches a minimum electrical conductivity. At this time substantially all of the remaining radioisotopes and other non-radioactive ions are again bound on the spent waste resin. Preferably, the minimum electrical conductivity of the process solution at the end of the oxidation step is in the range of from 1 to 100 µS/cm at 20° C. The process solution is pumped through the regenerating vessel 12 until the activity in the process solution is reduced to an acceptable lower limit.

e) Discharge of the Waste Resin

After the oxidation step is terminated and the remaining radioisotopes are again bound onto the spent waste resin, the spent waste resin depleted of C-14 is transferred to a waste container for on-site storage and/or disposal of the waste resin at the nuclear power plant. Due to the reduced activity of the waste resin depleted of C-14, storage requirements and disposal costs are reduced.

The remaining process solution is removed from the cycle and either reused or disposed. The apparatus is then ready for taking a further batch of the spent waste resin to be depleted of a target radioisotope.

The C-14 containing carbon dioxide recovered in the separation step is of commercial value and is preferably used in industrial, medical or scientific applications.

The methods and apparatus to separate C-14 and Co-60 can also be combined in one apparatus, or the apparatus can be equipped with means to separate other target radioisotopes, as will be apparent to a person skilled in the art from the above description.

The invention claimed is:

1. A method for the recovery of a radioactive isotope from a spent waste resin of a nuclear power plant, wherein the waste resin is an ion exchange resin selected from the group consisting of cationic and anionic exchange resins, mixed bed ion-exchange resins, and mixtures thereof, and wherein the spent waste is loaded with at least one radioisotope, the method comprising the steps of:
  a) treating a waste resin loaded with at least one radioisotope with an organic acid or an alkaline compound to release the at least one radioisotope from the spent waste resin and to obtain a process solution containing the at least one radioisotope;
  b) separating the at least one radioisotope from the process solution through a reaction specific to the radioisotope so as to obtain a process solution depleted of the at least one radioisotope, wherein said reaction specific to the radioisotope is selected from the group of a physical reaction, an electrochemical reaction and a precipitation reaction, and a combination thereof and wherein said depleted process solution comprises the organic acid or alkaline compound and ionic components;

c) reacting the organic acid or alkaline compound in the depleted process solution from step b) by in situ oxidation to water and form gaseous reaction products; and d) passing the reacted process solution from step c) through the treated waste resin of step a) to reload the ionic components on the waste resin.

2. The method according to claims 1, wherein the at least one radioisotope is selected from the group consisting of C-14, Co-60, Ag-110, Fe-59, Sr-90 and I-131.

3. The method according to claim 1, wherein the organic acid is a linear aliphatic carboxylic acid selected from the group consisting of mono-, di- or polycarboxylic acids and mixtures thereof.

4. The method according to claim 1, wherein the process solution in step a) is controlled at a pH of less than or equal to 3.

5. The method according to claim 1, wherein the alkaline compound is selected from the group of ammonia, hydrazine, linear aliphatic monoamines, diamines and polyamines, and mixtures thereof.

6. The method according to claim 5, wherein the process solution in step a) is controlled at a pH of at least 8.

7. The method according to claim 1, wherein an oxidizing agent is added to the process solution in step a).

8. The method according to claim 1, wherein step b) is repeated for separation of a further radioisotope from the depleted process solution.

9. The method according to claim 1, wherein the separated radioisotopes are recycled for use in chemical, biological and/or medical applications.

10. The method according to claim 1, wherein an oxidizing agent is added to the process solution in step c) for reacting with the organic acid or alkaline compound in the depleted process solution.

11. The method according to claim 1, wherein the depleted process solution in step c) is exposed to ultraviolet radiation.

12. The method according to claim 1, wherein the gaseous reaction products obtained in step c) are $CO_2$ and optionally nitrogen.

13. The method according to claim 1, wherein the at least one radioisotope is Co-60, and that the process solution in step a) has an electrochemical potential in a range of from 200 to 350 mV.

14. The method according to claim 13, wherein the Co-60 is oxidized from Co(II) to Co(III) in step a).

15. The method according to claim 1, wherein the radioisotope is Co-60 and that the reaction in step b) is an electrochemical reduction.

16. A method according claim 1, wherein the radioisotope is C-14, and the reaction in step b) is a physical stripping of $CO_2$ from the process solution.

17. An apparatus for carrying out the method according to claim 1, the apparatus comprising:
 a regenerating vessel for receiving a particulate waste resin loaded with the at least one radioisotope;
 a reaction chamber for thermal or photochemical oxidation of the organic acid or alkaline compound in the process solution, wherein the reaction chamber is arranged downstream of the regenerating vessel;
 a storage vessel for receiving the process solution arranged downstream of the reaction chamber and connected to the regenerating vessel to form a cycle, wherein the storage vessel has means for feeding the organic acid or alkaline compound into the process solution, and means for removing of gaseous reaction products from the process solution; and
 a bypass line for uncoupling of the regenerating vessel from the cycle.

18. The apparatus according to claim 17, wherein the apparatus further comprises a separation vessel for the specific reaction and separation of the at least one radioisotope from the process solution.

19. The apparatus according to claim 17, wherein the apparatus comprises means for measuring and controlling the pH value, the conductivity and/or the radiation activity of the process solution.

20. The apparatus according to claim 17, further comprising means for the addition of an oxidant to the process solution.

21. The apparatus according to claim 17, wherein the apparatus further comprises means for the collection and storage of the separated radioisotope.

* * * * *